F. W. PERRY.
EARTH AUGER.
APPLICATION FILED SEPT. 22, 1919.
1,399,074.
Patented Dec. 6, 1921.
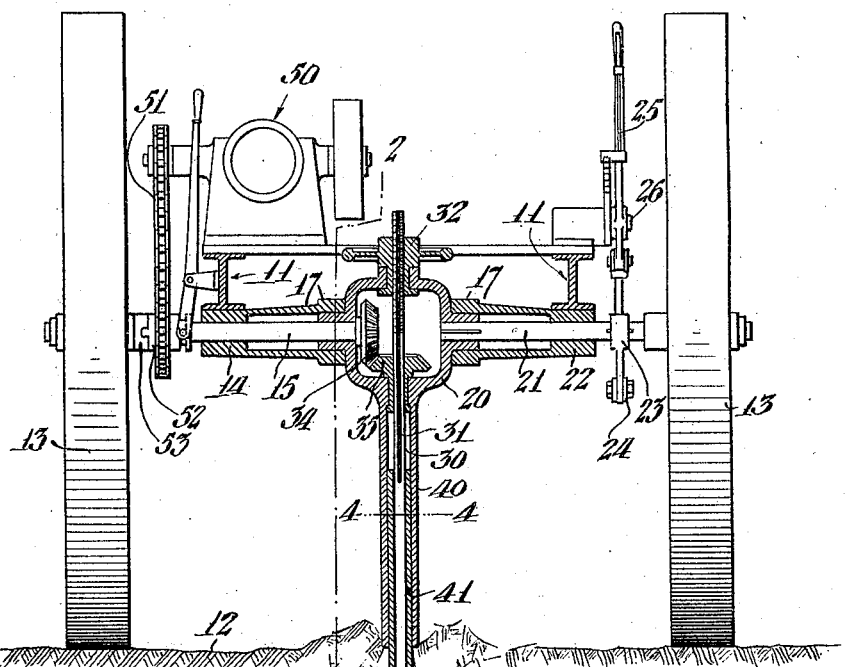
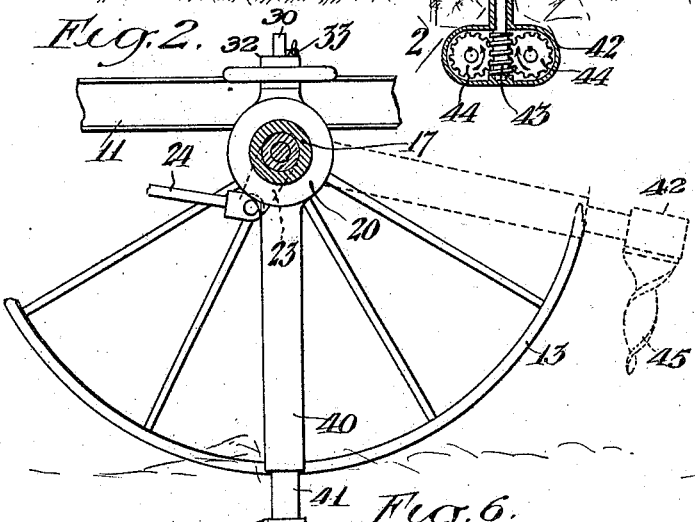
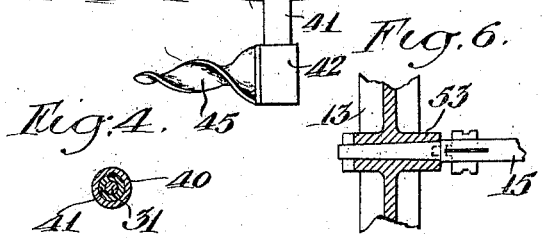
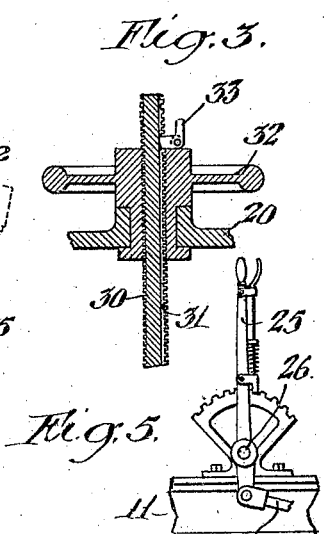
Inventor
Frank W. Perry
by Graham Lamie
Attorneys

UNITED STATES PATENT OFFICE.

FRANK W. PERRY, OF LOS ANGELES, CALIFORNIA.

EARTH-AUGER.

1,399,074.  Specification of Letters Patent.  Patented Dec. 6, 1921.

Application filed September 22, 1919. Serial No. 325,551.

*To all whom it may concern:*

Be it known that I, FRANK W. PERRY, a citizen of the United States, residing in Los Angeles, Los Angeles county, in the State of California, have invented a new and useful Earth-Auger, of which the following is a specification.

My invention relates to devices for breaking up and loosening soil, either for the purpose of preparing it for cultivation or for any other purpose.

My invention further relates to means for digging and throwing out from the ground various roots, such as sugar beets or the like.

Further objects and advantages will be made evident hereinafter.

Referring to the drawing which is for illustrative purposes only—

Figure 1 is a cross section through one embodiment of my invention, a portion thereof being shown in elevation to better illustrate the invention.

Fig. 2 is a section on a plane represented by the line 2—2 of Fig. 1.

Fig. 3 is a somewhat enlarged section showing the method of securing the vertical shaft in the adjusting wheel.

Fig. 4 is a section on a plane represented by the line 4—4 of Fig. 1.

Fig. 5 is a side elevation of the regulating lever and segment.

Fig. 6 is an alternative method of construction.

In the embodiment of the invention shown in these drawings, 11 is a frame which is supported above the surface of the ground 12 on wheels 13 or on the mechanical equivalent means, such as caterpillars, runners or the like. Turning freely in bearings 14 secured to the frame 11 is a horizontal shaft 15 on which one of the wheels 13 turns freely. Also mounted in bearings 17 secured to the frame 11 is a housing 20 into which the shaft 15 projects, this housing being so constructed that it swings freely about the axis of the shaft 15 which coincides with the axis of a shaft 21 turning in bearings 22 secured to the frame 11 on which the other wheel 13 is free to turn. The shaft 21 is keyed in the housing 20 and is provided with a lever 23 which is connected to a rod 24 which in turn is connected to a lever 25 turning about a pin 26, in a convenient position to be readily operated manually for the purpose of turning the housing 20 about the axis of the shafts 15 and 21.

Passing through the housing 20 at right angles to the axis of the shaft 15 and in the same plane is a shaft 30 which may conveniently be designated as a vertical shaft inasmuch as this is its normal position with the device in operation. This shaft has a keyway 31 cut therein and passes through a hand wheel 32 which is held longitudinally of the shaft 30 in the housing 20 being free to turn, however, about the axis of the shaft 30 inside the housing 20. The shaft 30 can be locked in the hand wheel 32 by means of a pivoted catch 33.

A beveled gear 34 is rigidly secured to the shaft 15 and a bevel gear 35 meshing with the gear 34 inside the housing 20 is secured by a feather key to the shaft 30. A housing extension 40 engages a gear case extension 41 which is keyed therein so that it cannot turn. Secured to the lower end of the gear case extension 41 is a gear case 42 into which the shaft 30 projects; a worm 43 being rigidly secured in the lower end of the shaft 30 and meshing with worm gears 44 which are rigidly secured to earth augers 45 which project in front of the gear case 42. The shaft 15 is driven by a gasolene engine 50 through a sprocket chain 51, a clutch 52 being provided, this clutch engaging a collar 53 secured to the shaft 15. In some cases the engine 50 may be omitted and the shaft may be driven directly from one of the wheels 13, the collar 53 in this case forming a part of the hub of this wheel.

The method of operation of the invention is as follows:—

The engine 50 drives the shaft 15 which in turn drives the shaft 30 through the gears 34 and 35. The augers 45 are driven from the shaft 30 through the worm 43 and the worm gears 44 turning in the direction of the arrows shown on the gears 44 in Fig. 1. As a result the augers 45 rotate in opposite directions and so that their adjoining surfaces move upwardly. The augers 45 are spaced just far enough apart to pass on each side of a sugar beet, the separation at the tips of the auger being sufficient to take in the largest beets.

When it is desired to use the auger for the purpose of digging beets or the like it is run into the field, the augers being raised in the position shown in dotted lines in Fig. 2 out of engagement with the surface of the ground while the apparatus is being transported from place to place. When it is desired to start the digging, the engine 50 is started and the clutch 52 is thrown into gear so that the augers 45 start to revolve. The housing 20 is then rotated by means of the regulating lever 25 so that the gear case and augers are forced down against the surface of the ground at which point the augers start to take hold of the ground, the spiral flanges thereon tending to pull the auger into the ground and at the same time break the ground up. When the shaft 30 assumes approximately a vertical position, the whole device can be pulled forward on the wheels 30 either by draft animals or by a tractor the augers 45 constantly loosening the ground and throwing up any beets or other roots which may come in their paths.

The hand wheel 32 is provided for the purpose of regulating the depth at which the augers work. The catch 32 being released and the engine 50 stopped, it is evident that by turning the hand wheel the shaft 30 can be moved up and down, the extension 41 sliding in the extension 40, and thus pushing the gear case 42 and the augers 45 to a greater or less distance beneath the surface in the gorund.

I claim as my invention:—

1. A device for breaking up and loosening soil comprising a frame; wheels supporting said frame above the surface of the ground; a horizontal shaft turning in bearings in said frame; a housing turning in bearings in said frame about the axis of said horizontal shaft; a vertical shaft projecting into said housing; means for driving said horizontal shaft; bevel gears connecting said horizontal shaft with said vertical shaft in all angular positions of said housing; a gear case secured to said housing in such a manner that it moves therewith; a worm rigidly fixed on said vertical shaft inside said gear case; a pair of earth augers journaled in said gear case and projecting forwardly therefrom; and a worm gear on each of said augers meshing with said worm.

2. A device for breaking up and loosening soil comprising a frame; wheels supporting said frame above the surface of the ground; a horizontal shaft turning in bearings in said frame; a housing turning in bearings in said frame about the axis of said horizontal shaft; a vertical shaft projecting into said housing; means for driving said vertical shaft; a gear case secured to said housing in such a manner that it moves therewith; a worm rigidly fixed on said vertical shaft inside said gear case; a pair of earth augers journaled in said gear case and projecting forwardly therefrom; and a worm gear on each of said augers meshing with said worm.

3. A device for breaking up and loosening soil comprising a frame, wheels supporting said frame above the surface of the ground, a vertical shaft, means for supporting said shaft in said frame so that said shaft may be swung about a horizontal axis at right angles to said shaft, means for so swinging said shaft, means for locking said shaft in any one of several positions about said horizontal axis so that said shaft may be secured in either a vertical or an inclined position, means for driving said shaft, and an earth auger swinging with said shaft and driven thereby, the axis of said auger being at an angle to the axis of said shaft.

4. A device as in claim 3 in which the axis of the auger is at approximately 90° to the axis of the shaft.

5. A device as in claim 3 also having means by which the vertical shaft may be moved along its axis and across the horizontal axis on which it swings to raise or lower the auger with relation to the surface of the ground.

In testimony whereof, I have hereunto set my hand at Los Angeles, California, this 13th day of September, 1919.

FRANK W. PERRY.